United States Patent
Bishop et al.

(10) Patent No.: US 9,413,597 B2
(45) Date of Patent: Aug. 9, 2016

(54) METHOD AND SYSTEM FOR PROVIDING AGGREGATED NETWORK ALARMS

(71) Applicant: Verizon Patent and Licensing Inc., Arlington, VA (US)

(72) Inventors: Reid J. Bishop, Colorado Springs, CO (US); Sanjiv Purushottam Damle, Colorado Springs, CO (US); Brian Delany, Colorado Springs, CO (US); Chris R. Gentile, Littleton, CO (US); Jeffrey D. Mohrmann, Manitou Springs, CO (US); Jonathan L. Spieker, Colorado Springs, CO (US); Michael L. Turok, Waban, MA (US); Jason Noel Verbeek, Pickerington, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 14/202,937

(22) Filed: Mar. 10, 2014

(65) Prior Publication Data
US 2015/0254969 A1 Sep. 10, 2015

(51) Int. Cl.
*G08B 29/00* (2006.01)
*H04L 12/24* (2006.01)

(52) U.S. Cl.
CPC ........ *H04L 41/0622* (2013.01); *H04L 41/0618* (2013.01)

(58) Field of Classification Search
CPC ............ H04L 41/0893; H04L 41/5003; H04L 41/5025; H04L 63/0281; H04L 63/0823; H04L 63/0884; H04L 63/10; H04L 63/101; G06F 11/1004; G06F 11/1092; G06F 12/1483; G06F 13/00; G06F 15/16; G06F 17/30; G08B 27/00; G08B 29/00
USPC .......................................................... 340/506
See application file for complete search history.

(56) References Cited

U.S. PATENT DOCUMENTS

| | | | | |
|---|---|---|---|---|
| 7,542,428 B1 * | 6/2009 | Johnson | ................ | H04L 41/064 370/241 |
| 8,782,086 B2 * | 7/2014 | Resch | .......................... | 707/785 |
| 9,086,994 B2 * | 7/2015 | Resch | | |
| 2007/0198222 A1 * | 8/2007 | Schuster et al. | .............. | 702/187 |
| 2011/0055277 A1 * | 3/2011 | Resch | .......................... | 707/785 |
| 2011/0314145 A1 * | 12/2011 | Raleigh et al. | ................. | 709/224 |
| 2012/0215911 A1 * | 8/2012 | Raleigh et al. | ................. | 709/224 |
| 2012/0221955 A1 * | 8/2012 | Raleigh et al. | ................. | 715/736 |
| 2013/0088951 A1 * | 4/2013 | Liu | ................. | 370/216 |
| 2013/0311618 A1 * | 11/2013 | Ruetschi et al. | .............. | 709/219 |
| 2014/0098671 A1 * | 4/2014 | Raleigh et al. | ................. | 370/235 |
| 2014/0181968 A1 * | 6/2014 | Ge | ...................... | H04L 63/1425 726/23 |
| 2014/0269465 A1 * | 9/2014 | Ballantyne et al. | ........... | 370/311 |
| 2014/0269483 A1 * | 9/2014 | Ballantyne et al. | ........... | 370/312 |
| 2014/0273909 A1 * | 9/2014 | Ballantyne et al. | ........ | 455/404.1 |

FOREIGN PATENT DOCUMENTS

EP          2093729 A2 *  8/2009   ............. G08B 13/24
WO   WO 2014163605 A1 * 10/2014

* cited by examiner

*Primary Examiner* — Kerri McNally

(57) ABSTRACT

An approach for providing aggregated network alarm notifications is described. An alarm management platform aggregates one or more network alarms based on a geographic proximity, a temporal proximity, or a combination thereof. The alarm management platform identifies a network event based on the aggregating of the one or more network alarms, and then presents the network event in a user interface to represent the one or more network alarms.

15 Claims, 12 Drawing Sheets

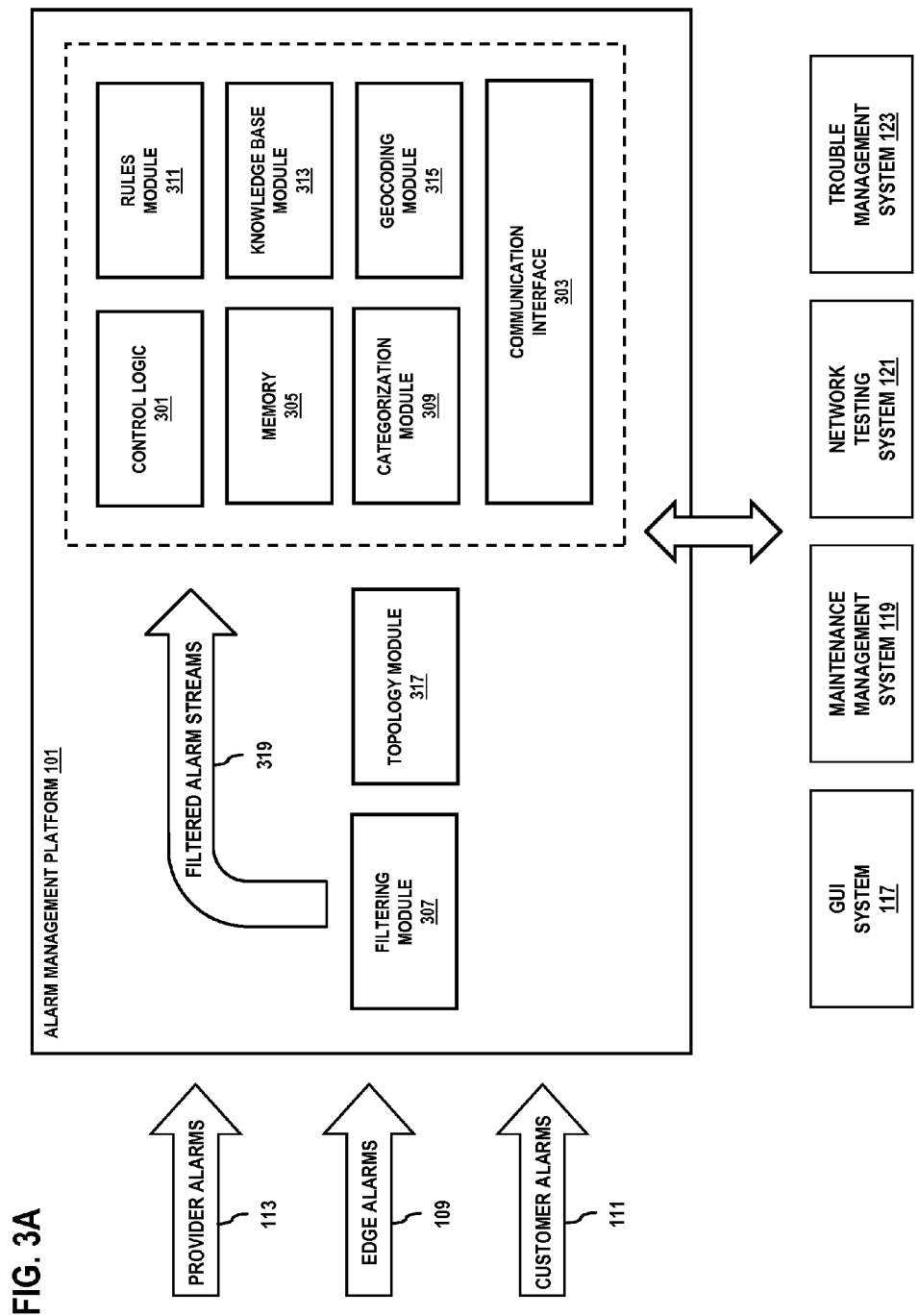

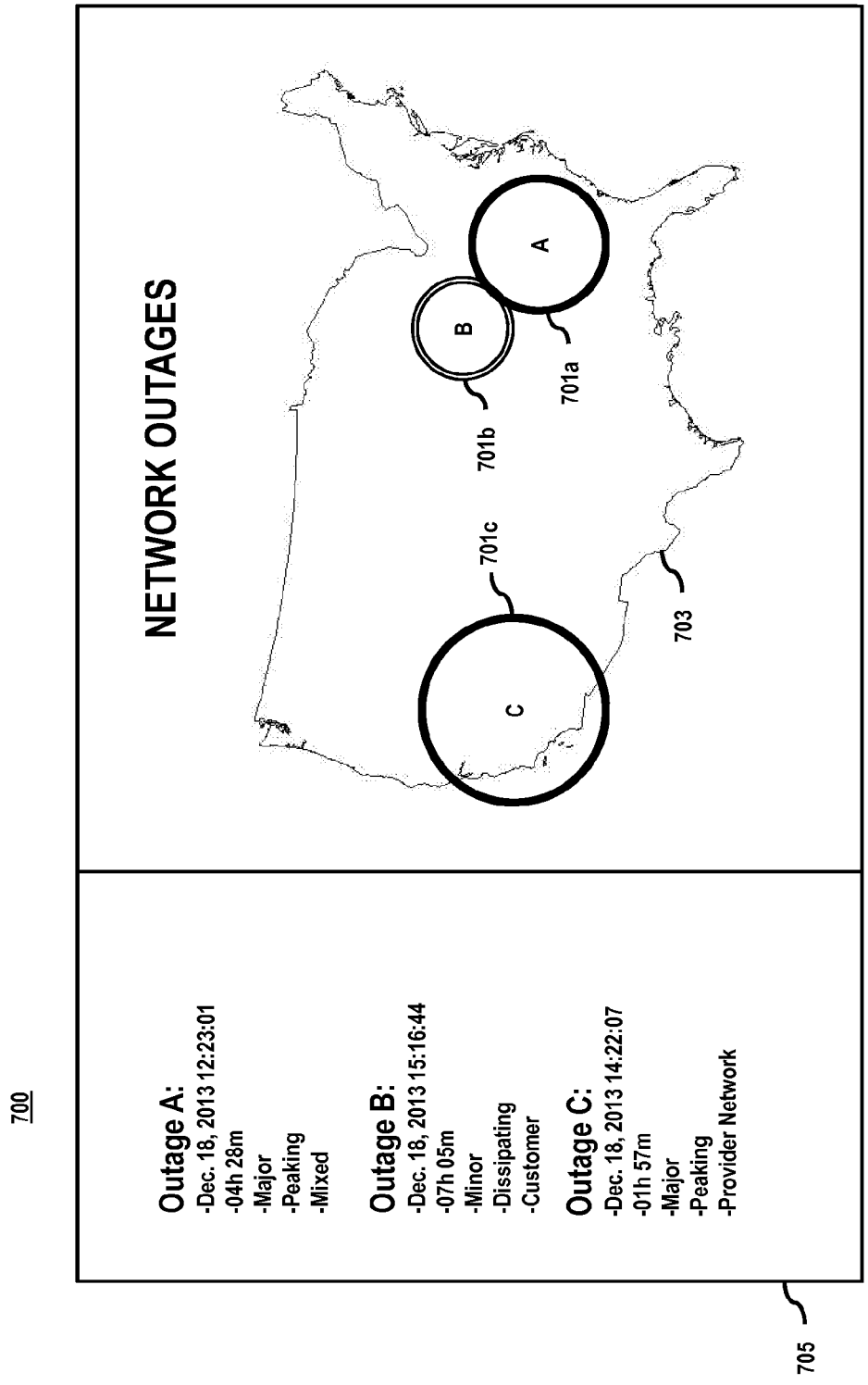

OUTAGE A SUMMARY

| SUMMARY | VALUE | MAX VALUE |
|---|---|---|
| Stage | Peaking | |
| Category | Mixed | |
| Weight | 39 | 39 |
| Alarms | 247 | 247 |
| Customer Alarms | 207 | 207 |
| Network Alarms | 40 | 40 |
| Circuits | 151 | 151 |
| Customers | 100 | 100 |
| Tickets | 78 | 78 |
| Latitude | 40.204697 | |
| Longitude | -74.715180 | |
| Radius (meters) | 492,290.184 | |

FIG. 7C

OUTAGE A ALARMS — 740

| PRESENT | CLEARED | CUSTOMER | CIRCUIT | TICKET |
|---|---|---|---|---|
| X | X | Unknown | CU3 | 4522667 |
| X |   | Customer 1 | VVF | 5634777 |
| X | X | Customer 4 | 4DA | 2343528 |
| X | X | Customer 4 | IOD | 6745678 |
| X |   | Customer 2 | 4RW | 8435643 |
| X | X | Customer 1 | NNM | 6432267 |
| X | X | Customer 2 | Q2D | 0974366 |
| X | X | Customer 3 | CZ3 | 1254243 |
| X |   | Customer 3 | 9UY | 9543674 |
| X |   | Customer 2 | EER | 3332612 |
| X | X | Customer 4 | OPO | 1145229 |
| X | X | Customer 4 | H7U | 7245521 |

METHOD AND SYSTEM FOR PROVIDING AGGREGATED NETWORK ALARMS

BACKGROUND INFORMATION

Modern communication systems are vital to business operations, such that downtime or outages of those systems can impose a significant cost. Therefore, ensuring that networks perform to their architected availability and mitigating the risk of downtime are key drivers for information managers. Whether the infrastructure is supporting e-commerce, regulatory compliance reports, supply chain management, or even internal electronic mail, loss of connectivity has a severe impact. For example, the impact of network failures (even very minor ones lasting only minutes) can be measured in thousands or even millions of dollars. The ability to quickly identify faults and restore network connectivity are critical to helping companies meet and exceed their business objectives. Consequently, network monitoring systems are needed to detect network anomalies that stem from, for instance, network component failures, cable cuts, etc. However, such monitoring systems can potentially result in large volumes of network alarms that can potentially make it difficult for network managers to identify and prioritize network issues (e.g., outages, faults, etc.) as they emerge.

Based on the foregoing, there is a need for providing aggregated network alarms and/or alarm notifications to facilitate identification and/or response to emerging network issues.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3A is a diagram of components an alarm management platform, according to one embodiment;

FIGS. 7A-7C are diagrams of user interfaces utilized in the processes of FIGS. 1-6, according to various embodiments;

DESCRIPTION OF THE PREFERRED EMBODIMENT

An apparatus, method and software for providing aggregated network alarm notifications is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments are discussed with respect to aggregating network alarms within a communications network, it is contemplated that the various embodiments described herein are also application to other types of networks or utilities that serve a body of users and have the potential to experience network or utility faults. For example, where communication network faults such as outages are discussed, the approaches can also be applied to utility outages (e.g., electrical outages, water supply outages, etc.) detected using various alarms or other monitoring systems.

Figure 1:
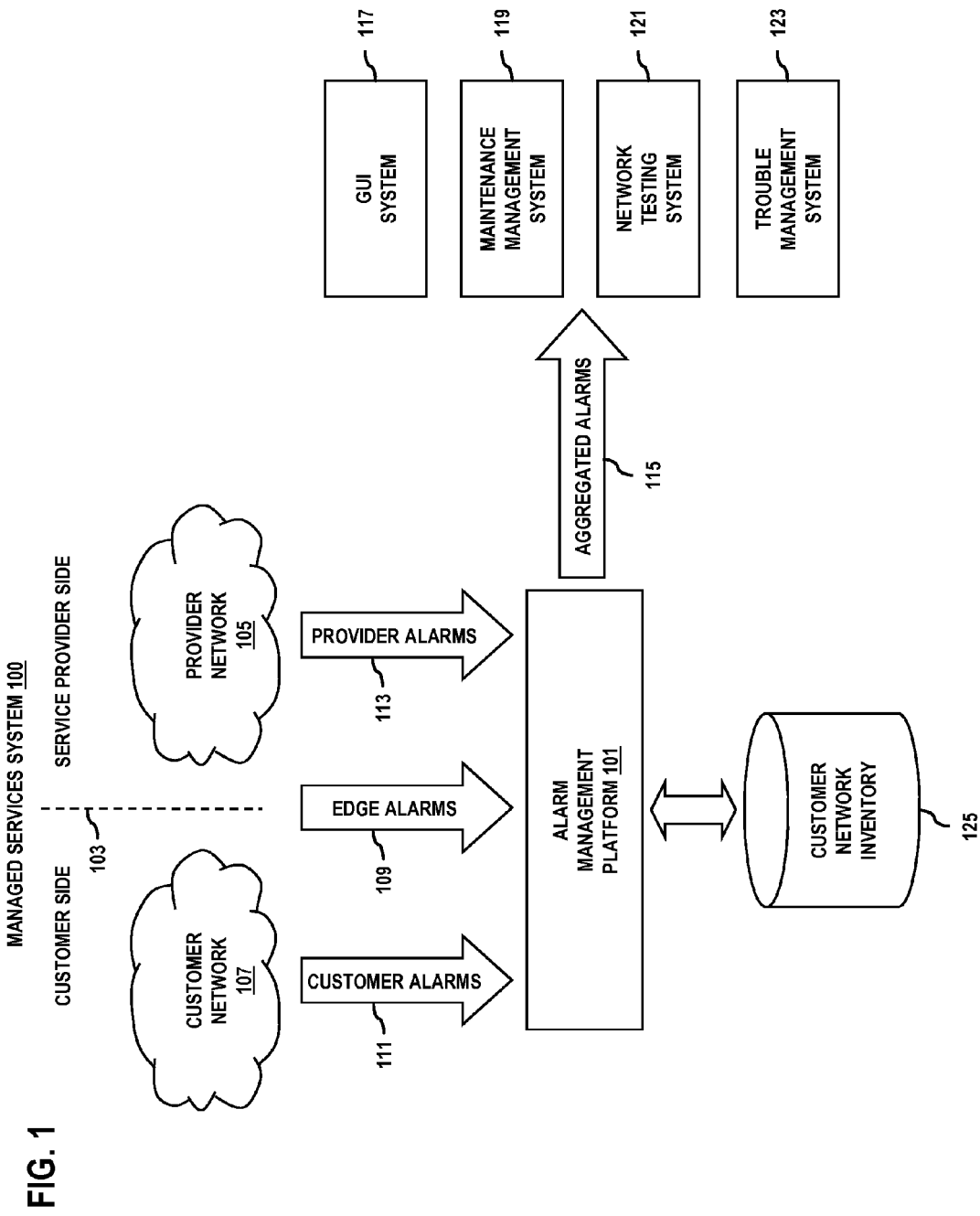
FIG. 1 is a diagram of a system for providing aggregated network alarms, according to one embodiment.

FIG. 1 is a diagram of a system for providing aggregated network alarm notifications, according to one embodiment. In general, networking monitoring involves receiving and interpreting a multitude of alarms or alarm notifications that are assigned to various network components. These alarms are triggered when anomalies are detected in their respective components. In one embodiment, monitoring systems provide these alarms in the form of reports for network analysts (or network monitors) to analyze the cause of the network anomaly and to initiate action to resolve the cause. However, given the size and complexity of modern networks, the number of alarms and/or alarm notifications can become unmanageable. That is, the network monitors may be inundated periodically with alarm reports stemming from a major network problem, or even a series of small anomalies arising within a short time span. These events can thus trigger a tremendous volume of alarm notifications, which can overwhelm network surveillance engineers and hamper the process of addressing the cause of the events.

Therefore, there is a need for aggregating the alarm notifications to a more manageable level. Historically, one approach to reducing or aggregating network alarms relies on correlating alarms and/or affected customers based on network topology information. However, this can be a very difficult approach based on the fact that a network's topology can potentially span multiple systems that can employ various ways for representing topology information. Accordingly, determining an accurate or complete picture of a network's topology can be a burdensome and time consuming task that currently produces an incomplete picture. This incomplete network topology information, in turn, reduces the ability to aggregate or correlate network alarms using topology alone.

To address this problem, a managed services system 100 of FIG. 1 aggregates network alarms based on geographic proximity and time for presentation of the alarms to network monitors. More specifically, the managed services system 100 performs proximity and/or time based aggregation of network alarms to estimate geographic areas that are potentially affected by a specific network event (e.g., a network outage), thereby avoiding a need to use or have complete network topology information to aggregate network alarms and correlate them to affected areas. The managed services system 100 then, for instance, presents the aggregated alarms along with the estimated geographic areas affected by the network event associated with the aggregated alarms in a mapping user interface.

As shown in FIG. 1, the managed services system 100 includes an alarm management platform 101 that collects alarms from network elements from the edge 103 between a service provider network 105 and a customer network 107, as well as from the customer network 107 and the provider network 105 themselves. By way of example, the edge 103 represents the "last mile" of the provider network 105 where it connects to the customer network 107. Accordingly, in one embodiment, the network alarms include edge alarms 109 collected from the edge 103, customer alarms 111 collected from the customer network 107, and provider alarms 113 collected from the provider network 105. For example, in one embodiment, the managed services system 100 can actually see or have access to monitoring services with the customer network 107 (e.g., through service agreements, operational contracts, etc.) and collect the customer alarms 111. In another embodiment, the managed services system 100 is also aware of or collects provider alarms 113 from the core of the provider network 105.

In one embodiment, the alarm management platform 101 includes a customer correlation engine that aggregates the collected alarms 109-113 by proximity and/or time. The alarm management platform 101 then is responsible for presenting these aggregated alarms 115 to, for instance, Network Operations Centers (NOCs) for troubleshooting, diagnosis, and/or repair to provide customers with responsive network fault recovery.

For example, the alarm management platform 101 passes the aggregated alarms 115 to a graphical user interface (GUI) system 117 for presentation to the NOCs or other network monitors. In embodiment, the alarm management platform 117 via the GUI system 117 provides a geographic view of the potential network events (e.g., outages) that correlate to the aggregated alarms 115. By way of example, the geographic view may include a mapping user interface that depicts a map on which geographical areas affected by potential network events are represented. For example, the mapping user interface may depict a geographic center of the aggregated alarms or network event as well as an estimated extent of the geographic area affected by the network event. It is noted that the mapping user interface of the GUI system 117 is provided by way of example and not limitation. Accordingly, it is contemplated that the GUI system 117 may use any type of user interface or representation of the alarms aggregated by proximity and/or time for presentation to the NOCs or other network monitors.

In one embodiment, the alarm management platform 101 uses rules for aggregating and/or filtering alarms to reduce the number of alarms presented to end users, and thereby advantageously reduce the chances that end users may become overwhelmed by the volume of network alarms. These rules, for instance, may apply statistically driven and predictable approaches to evaluating, correlating, aggregating, etc. the network alarms. For example, the rules may be based on expert knowledge bases and employ flexible criteria for determining separating network alarms that represent noise and clutter from alarms that may indicate a significant or otherwise meaningful network event (e.g., an outage).

In one embodiment, the alarm management platform 101 may classify the alarms into different alarm types. These alarm types can then be assigned different weighting when calculating or determining how to aggregate and/or present the aggregated alarms to network monitors. The weighting can then be used to drive what data is presented by the GUI system 117 to end users. For example, one alarm may be classified as a minor network fault and may require many more similar alarms to be aggregated in proximity and/or time to be sufficiently weighted so that the platform 101 may declare that the aggregated alarms rise to a sufficient level as to warrant presentation to network monitors. On the other hand, a single alarm indicating a major network event (e.g., a fiber optic line cut) may be weighted so that it is immediately presented to network monitors. In one embodiment, the weighing may be incorporated or used as criteria in the rules applied by the alarm management platform 101 as described above.

In one embodiment, the alarm management platform 101 may specify different aggregation configuration parameters and/or rules for different alarm types or categories. In one example, configuration parameters may be used to control the time and/or proximity criteria used for aggregating alarms, and well as how and when each alarm type is presented to network monitors. In this way, the alarm management platform 101, for instance, can apply different aggregation criteria and notification options based on the alarm type (e.g., network-to-network alarms, customer-to-network alarms, and customer-to-customer alarms) that is detected.

In one embodiment, the alarm management platform 101 may categorize the source of detected alarms and apply different aggregation parameters/rules and/or notification procedures. For example, the alarm management platform 101 may designate one or more sources of detected alarms with different priority levels. These priority levels may be associated with whether the alarms originate from higher priority customers and/or higher priority circuits/networks/equipment/etc. For example, the alarm notification user interface or map may indicate that one or more of the presented alarms are affecting higher priority customers or circuits.

In one embodiment, the alarm management platform 101 may also provide the aggregated alarms 115 to other components of the managed services system 100 that are responsible for addressing network events. For example, the aggregated alarms 115 may be provided to a maintenance management system 119 to determine whether to initiate maintenance operations or a maintenance ticket in response to a network event. Similarly, the aggregated alarms 115 may be provided to network testing system 121 to confirm potential network faults, and to a trouble management system 123 to issue a trouble ticket for the network event. These components are provided as examples and are not intended limit the types or numbers of system that can use the aggregated alarms 115 generated by the managed services system 100.

In one embodiment, the alarm management platform 101 can also interact with the any of the systems 119-123 to determine any actions taken by the system 100 in response to the presented aggregated alarms 115. For example, if a trouble ticket is issued by the trouble management system 123 in response to the aggregated alarms 115, then the alarm management platform 101 may apply an increased weighting for the aggregated alarms 115. Similarly, if any of the other systems 119-121 indicate that any actions were taken, different weighting may be applied.

In one embodiment, the alarm management platform 101 can monitor the aggregated alarms 115 and/or the responses to the aggregated alarms 115 by the system 119-123 over a period of time. This monitoring can then be used, for instance, to further characterize the aggregated alarms 115. For example, if trouble tickets are increasing for an aggregated alarm 115, then the alarm management platform 101 may classify the alarm as "peaking" or other similar term. If trouble tickets are decreasing or being cleared for an aggregated alarm 115, then the alarm management platform 101 may classify the alarm as "dissipating" or other similar term. In one embodiment, the GUI system 117 may use any representation of these characteristics or any other characteristic of the aggregated alarms 115 in a user interface (e.g., a mapping user interface as map data).

In one embodiment, the alarm management platform 101 may estimate the geographic area affected by an aggregated alarm 115 and/or its associated network event using an expert knowledge base and/or historical information. For example, for a given alarm type or network event of an aggregated alarm 115, the alarm management platform 101 may query the knowledge base for an estimated impacted area. In another example, the alarm management platform 101 may analyze historical data regarding previously documented network events to determine an extent of the geographic area affected.

In some embodiment, the alarm management platform 101 may also estimate a number of affected customers within the affected geographic areas. The alarm management platform 101, for instance, may use addressing information in customer accounts, population density estimates, etc. to estimate or calculate the number of affected customers.

In one embodiment, the alarm management platform 101 may also use any available topology information as part of the alarm aggregation process. In one embodiment, the any available network topology information can be stored in the customer network inventory 125. By way of example, the alarm management platform 101 may use any available topology information to help determine an extent of the affected geographic area or whether certain alarms or alarms types should be aggregated. In another example, the alarm management platform 101 may use the availability of network topology information to determine whether aggregation should be performed using network topology information only, using proximity/time information only, or a combination of the approaches.

In one embodiment, the alarm management platform 101 can serve multiple customer networks either individually or in combination to interface with various network management systems (e.g., systems 119-123) to provide a unified view of network events/problems to network management personnel. In this regard, the alarm management platform 101 can serve as a global account manager to provide user authentication services, including a single-sign on capability as well as workstation independence. By way of example, the alarm management platform 101 may provide a portal or other interface for providing numerous features of the system 119-123 that can enhance productivity for the network analyst. These features, for example, include workflow, ticketing, topology information, task automation, command interaction capabilities, as well as interfaces for maintenance activities, outage notifications, and contact information.

In one embodiment, the alarm management system 101 and/or the systems 117-123 has a JAVA® 2 Enterprise Edition (J2EE) application framework to leverage its support for database connectivity, transaction processing, and directory services in a reliable and secure environment.

The customer (or managed) network 107, in an exemplary embodiment, can be an enterprise network providing voice and/or data services for the enterprise. For instance, the customer network 107 can be an Internet Protocol (IP)-based network supporting data communication as well as IP telephony; it is noted any variety of local area network (LAN) and wide area network (WAN) technologies can be deployed within the network 107—e.g., Asynchronous Transfer Mode (ATM), Ethernet-based, etc.

On the service provider side, the alarm management platform 101 has access to the customer network inventory 125, which stores information (as necessary for performing alarm aggregation) about the network components of the customer network 107. As previously described, if network topology information about the customer network 107 is available, that information can be stored in the customer network inventory 125 as well.

In one embodiment, the alarm management platform 101 interfaces with various systems, including the maintenance management system 119, the network testing system 121, and the trouble management system 123. The alarm management platform 101, thus, provides the ability to discover or store the topology of the customer network 107 and/or the provider network 105, review alarms/events on the networks, eliminate events from consideration due to pre-determined maintenance windows, and correlate the alarms into significant events.

Also, the also management platform 101 supports an automation engine that engages the appropriate test scripts based upon the event to further isolate the problem. For example, Customer Premise Equipment (CPE) of the networks 105 and 107 are polled (through, for example, out-of-band access if connectivity has been lost), and test points across the networks 105 and 107 as well as the backbone network (not shown) are checked at all appropriate locations including at a Local Exchange Carrier (LEC) network. These automated end-to-end checks can be performed simultaneously, without human intervention, resulting in a trouble ticket if necessary. After testing, a single report is generated, capturing the conclusion of all the testing. The report can then be provided to an analyst (e.g., a Network Operations Control (NOC) engineer or personnel of the service provider), who can then work on the restoration of the networks 105 and 107 as needed.

As previously discussed, alarms and/or events are generated by the edge 103, the provider network 105, and/or the customer network 107, and forwarded to the alarm management platform 101. At any time during the process of aggregating or correlating alarms within the system 100, a user (e.g., network administrator, etc.) can retrieve information about the aggregated alarms 115 via the GUI system 117. In one embodiment, the GUI system 117 can be a web browser or a local network management platform.

In one embodiment, the networks 105 and 107 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like. Meanwhile, data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network 105 may embody circuit-switched and/or packet-switched networks that include facilities to provide for transport of circuit-switched and/or packet-based communications. It is further contemplated that networks 105 and 107 may include components and facilities to provide for signaling and/or bearer communications between the various components or facilities of system 100. In this manner, the communication networks 105 and 107 may embody or include portions of a signaling system 7 (SS7) network, Internet protocol multimedia subsystem (IMS), or other suitable infrastructure to support control and signaling functions.

Figure 2:
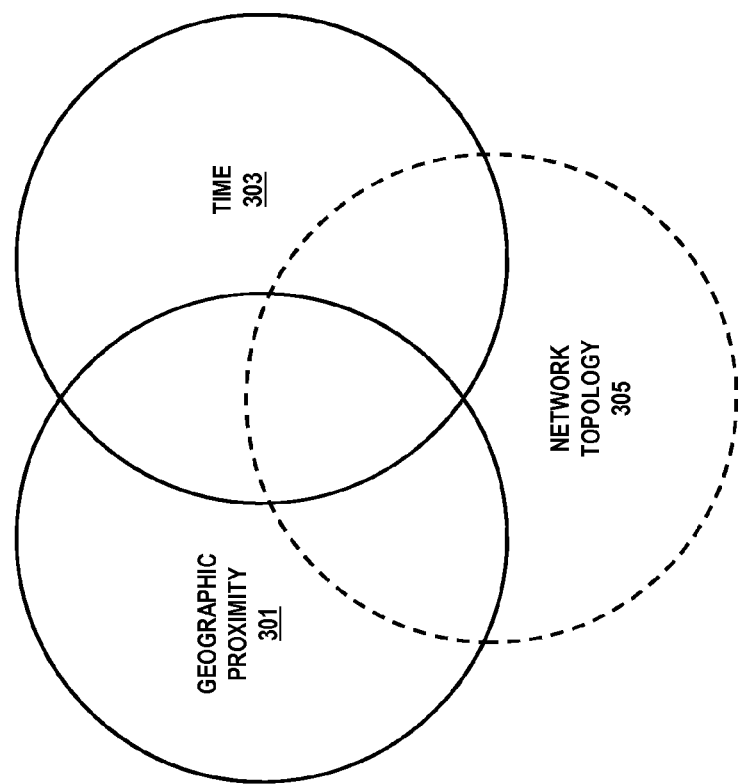
FIG. 2 is a diagram illustrating a process for aggregating network alarms by proximity and time, according to one embodiment.

FIG. 2 is a diagram illustrating a process for aggregating network alarms by proximity and time, according to one embodiment. As described above, in various embodiments, the alarm management platform 101 performs one or more functions for aggregating network alarms and presenting those alarms according to geographic area by analyzing geographical proximity parameters 301 and time parameters 303 to correlate alarms. In some embodiments, the alarm management platform 101 also uses network topology parameters 305 to further refine the alarm aggregation and correlation processes described herein.

More specifically, the alarm management platform 101 applies a multi-parameter approach to more specifically aggregate alarms. As illustrated in FIG. 2, the alarm management platform 101 applies proximity, time, and/or topology-based processes in combination to achieve greater specificity, accuracy, reliability, etc. when aggregating network alarms.

In one embodiment, to perform geographic proximity 301 aggregation, the alarm management platform 101 performs one or more of the following example processes: (1) filter network and/or customer alarms (e.g., alarms 109-113), for instance, to reduce noise and clutter in the alarm streams; (2) determine alarm type information of the alarms remaining after filtering; (3) establish locations of the alarms; and/or (4) apply appropriate clustering or aggregation rules to alarms based on geographic proximity. This geographic proximity 301 clustering of alarms will result in aggregated alarms 115 that group component network alarms (e.g., alarms 109-113) by their geographic proximity.

Similarly, for the time 303 aggregation, the alarm management platform 101 performs one or more of the following example processes: (1) filter network and/or customer alarms; (2) determine alarm type information of the alarms remaining after filtering; and/or (3) apply appropriate clustering or aggregation rules based on time parameters.

In one embodiment, the alarm management platform 101 can then determine an intersection of the geographically clustered alarms with the temporally clustered alarms to generate a set of aggregated alarms 115 for presentation to network monitors or other end users.

In yet another embodiment, if network topology information is available, the alarm management platform 101 can, in addition or alternatively, perform the following example processes: (1) post alarms to a network topology processing unit (e.g., the topology modules discussed below with respect to FIGS. 3A and 3B); (2) analyze circuit and/or network hierarchies to determine those potentially affected by the alarms; (3) apply one to many rules to further identify potentially affected network components; and/or (4) establish a root cause of the alarms and identify affected circuits. By way of example, the alarm management platform 101 can then combine the topology 305 based aggregation with the proximity 301 and time 303 based aggregations to determine a set of aggregated alarms 115 to present.

Figure 3B:
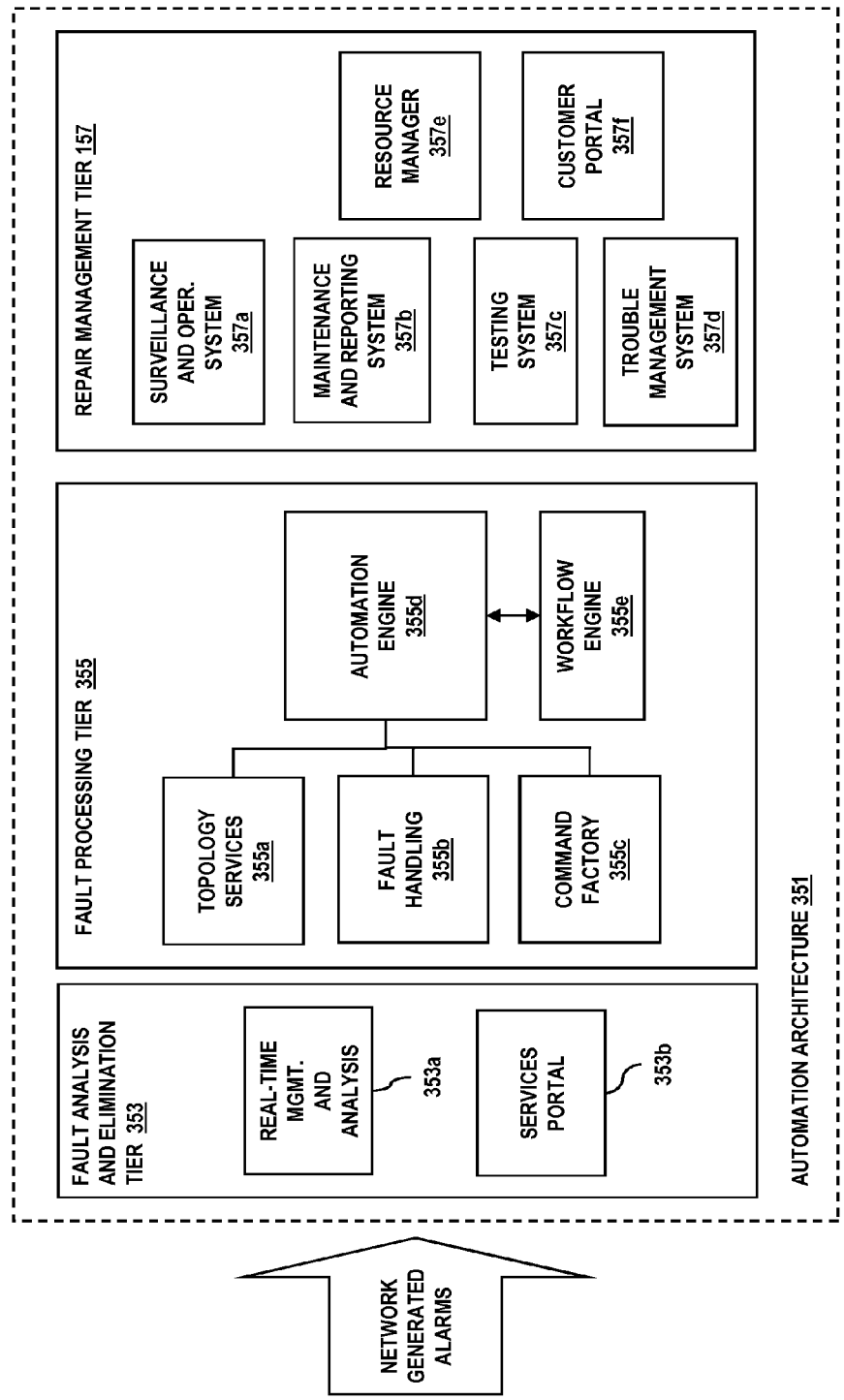
FIG. 3B is a diagram of an automation architecture for implementing an alarm management platform, according to one embodiment.

FIG. 3A is a diagram of components an alarm management platform, according to one embodiment. By way of example, the alarm management platform 101 includes one or more components for providing aggregated network alarms according to the various embodiments described herein. It is contemplated that the functions of these components may be combined in one or more components or performed by other components of equivalent functionality (e.g., the components of the automation architecture described with respect to FIG. 3B). In this embodiment, the alarm management platform 101 includes a control logic 301, a communication interface 303, memory 305 for storing programs and related data, a filtering module 307, a categorization module 309, a rules module 311, a knowledge base module 313, a geocoding module 315, and a topology module 317.

In one embodiment, the control logic 301 oversees tasks performed by the other components of the alarm management platform 101. For example, although the other modules may perform the actual task, the control logic 301 may determine when and how those tasks are performed or otherwise direct the other modules to perform the task. In one embodiment, the control logic 301 may be used to determine which user interface to present based on device capability information, resource availability information, or a combination thereof.

In certain embodiments, the communication interface 303 is used for communication between the alarm management platform 101 and the other components of the system 100 including, for instance, communications related to receiving alarms 109-113 and/or communications related to interacting with the GUI system 117, the maintenance management system 119, the network testing system 121, and/or the trouble management system 123. In one embodiment, the communication interface 303 may also be used to communicate commands, requests, data, etc.

In one embodiment, the control logic 301 interacts with the filtering module 307 to process and filter incoming network alarms (e.g., edge alarms 109, customer alarms 111, and/or service provider alarms 113) to eliminate potential noise or clutter from extraneous or other alarms that do not rise to a level of concern for network monitors. In one embodiment, the filtering module 307 may apply any rule or algorithm for determining what network alarms are to be filtered, and to generate one or more filtered alarm streams 319. The filtered alarm streams 319, for instance, are passed onto the other components of the alarm management platform 101 for further processing.

In one embodiment, the filtering module 307 may interact with the knowledge base module 313 to leverage expert knowledge or expert rules regarding what alarms should be filtered. For example, the rules may specify characteristics related to alarm type, estimated impacts, historical alarm information, etc. to determine how and what alarms to filter.

In one embodiment, on generating the filtered alarm streams 319, the filtering module 307 can interact with the categorization module 309 to further define or characterize the alarms in the filtered alarm streams 319. For example, the categorization module 309 may determine alarm type information for the alarms. In one embodiment, alarm type information can specify the origin of the alarms (e.g., edge alarm 109, customer alarm 111, provider alarm 113, or a combination thereof). In other embodiments, the alarm type information corresponds to the specific network faults such as IP connection failure, equipment failure, etc. As described below with respect to FIG. 3B, the alarm type information can be specified using system codes or other similar identifiers.

After categorization of the alarms (e.g., determining alarm type information), the categorization module 309 interacts with the rules module 311 to aggregate and correlate the alarms 115. In one embodiment, the rules module 311 can apply dynamic and flexible rules for aggregating or correlating. As described with respect to filtering, the rules module 311 can interact with the knowledge base module 313 to retrieve expert knowledge and/or rules for aggregating alarms. The expert knowledge and/or rules, for instance, can be defined by network experts and for storage by the knowledge base module 313. By way of example, the aggregating rules applied be based on proximity and temporal parameters such as minimum and maximum distances for proximity determination, default geographic shapes (e.g., circles, polygons) for estimating affected geographic areas, minimum and maximum time windows for aggregating, etc.

Once the rules module 311 completes its aggregation process (e.g., proximity and/or time based aggregation), the rules module 311 can interact with the geocoding module 315 to correlate the aggregated alarms 115 to a specific geographical area. For example, the geocoding module 315 can translate geographic coordinates (e.g., latitude and longitude) into street addresses for display by the GUI system 117, and vice versa. In embodiment, the GUI system 117 may employ a cartography data viewer that can present aggregated alarms and related information as map data on a mapping interface. By way of example, the GUI system 117 can provide a mapping user interface or view that provides cross browser support using standard toolkits (e.g., Google® Web Toolkit)

In one embodiment, the geocoding module 315 can also translate location information for the alarms for the topology module 317. In this way, the topology module 317 can consult available network topology information (e.g., circuits, circuit hierarchies, etc.) to facilitate aggregating and/or correlating the alarms, and to identify potentially affected geographic areas and/or customers for presentation by the GUI 117 or use by any of the other systems 119-123.

FIG. 3B is a diagram of an automation architecture for implementing an alarm management platform, according to one embodiment. In one embodiment, the alarm management platform 101 and/or the system 117-123 can be implemented using an automation architecture 351 comprising three tiers: a fault analysis and elimination tier 353, a fault processing tier 355, and a repair management tier 357. In one embodiment, the output of the tiers 353-357 can be used to further aggregate, correlate, and/or characterized the alarms 109-113 and/or the aggregated alarms 115.

The fault analysis and elimination tier 353 of the architecture effectively provides a user interface (e.g., graphical user interfaces (GUIs)) via a real-time management and analysis module 353a and a services portal 353b. This tier 353 provides GUIs that are used to interact with alarms (e.g., the aggregated alarms generated as previously described), tickets, and workflow events that exist within the system 100. Tier 353 also has the ability to call web links directly to both the systems of the repair management tier 357 as well as other business processes, which can provide access to detailed information and business functions when needed.

The services portal 353b provides an interface to the customer for the following capabilities: project management, order management, change management, network management, activity completion reporting and service provisioning for managed services. The portal 353b can possess an associated database (not shown) for managed services customer premise equipment as well as, for example, related customer contact data, IP addresses, operations process and service level agreements, maintenance agreements, etc.

The services portal 353b is also capable of receiving service order information. The portal 353b maintains knowledge of related circuit connections corresponding to the managed CPE. Alternate carrier circuit information is also supported.

According to one embodiment of the present invention, the services portal 353b employs a web services eXtensible Mark-up Language (XML) interface. This interface can provide access to services portal data, including customer and site contact information, procedures at customer and site level, CPE detail, circuit numbers, change management activities, IP addressing, alert status, etc.

Further, the services portal 353b can accommodate network devices that are shared by multiple customers to support services, such as virtual routers and virtual firewalls, in which customers are assigned private network services that are provided by shared devices. Additionally, the services portal 353b can obtain and present backbone edge router port/interface configurations upon demand and include this information with network configuration inquiries from the topology services module 355a or the command factory 355c. It is noted that audit circuit information and port/interface configuration between edge routers and customer CPE can be conducted on a regular basis (e.g., periodically). Inconsistent data will either result in automated updates or notification of the specific contact within the services portal 353b for that customer.

The fault analysis and elimination tier 353 can comprise a collection of network and element management platforms that provide direct management of network elements. The systems within this tier 353 can communicate with the fault processing tier 355, which serves as a manager of managers, via a common XML based information exchange model and Common Object Request Broker Architecture (CORBA) communications bus architecture, for example.

To appreciate the present invention, it is instructive to discuss briefly the CORBA specification as well as object-oriented technology in general. CORBA is a specification that enables software modules to communicate with other software modules in other programs, even if the two programs are written in different programming languages and are running on different platforms. A software component is an individual modular software routine that has been compiled and dynamically linked, and is ready for use with other software components and programs. A software component has an intended purpose, which is to perform a specified function or functions. A software application is a collection of software components and an application facilitates the interaction between software components using the underlying communications infrastructure.

In a CORBA environment, a program makes a request for services of software modules through an Object Request Broker (ORB), and thus, does not need to know the design and composition of the program, which includes the software. In client/server applications, an ORB is an interface to which the client makes a request for service from a software object.

In an object-oriented programming environment, a client is defined as a member of a class or group that uses the services of another class or group to which the client is not related by way of inheritance from a common class or group. More generally, a client is a software module that requests a service provided by another software module. The client uses the requested service without having to know any working details about the other software module or the service. In a network environment, a server is defined as a computer or program that responds to commands from a client.

In a large enterprise such as a corporation, enterprise computing is the use of computers in a network or series of interconnected networks that generally encompass a variety of different platforms, operating systems, protocols, and network architectures. Middleware is software that is transparent to a user, which takes two or more applications and makes them work seamlessly together. With middleware technology, a user can design an ordinary component to provide its regular function, and then insert an appropriate middleware mix when the component is built or created at run time. For instance, CORBA is a middleware project.

A CORBA object bus defines the design of the resident components and how these components communicate with one another. CORBA was designed to allow intelligent components to discover each other and interoperate on an object bus. However, CORBA goes beyond interoperability. CORBA also specifies an extensive set of bus-related services for creating and deleting software objects, accessing them by name, storing them in persistent stores, externalizing their states, and defining ad hoc relationships between them.

CORBA software objects are components of intelligence that may reside anywhere on a network. They are packaged as binary components which remote clients may access via method invocations. Both the language and compiler used to create server software objects are transparent to clients. Clients have no need to know where the distributed software object resides or on what operating system it executes. The distributed software object may be in the same process or on a machine that sits across a large network. Additionally, clients have no need to know how a server software object is implemented. For example, a server software object may be implemented, for example, as a set of JAVA® classes, or it may be implemented as a large COBOL (Common Business-Oriented Language) program. The client only needs to know the interface its server software object publishes. The interface then serves as a binding contract between clients and servers.

The fault analysis and elimination tier 353 can provide the following services to the fault processing tier 355: highly reliable fault and performance data collection, command and control of the network elements, alarm reduction (e.g., root cause analysis), a common CORBA XML interface to the fault processing tier 155, and synchronization between tiers 353 and 355.

The fault processing tier 355 plays a central role within the automation architecture, functioning as a manager of managers, incorporating business logic that support network management activities. In particular, the tier 355 includes a topology services module 355a, a fault handling module 355b, a command factory 355c, an automation engine 355d, and a workflow engine 355e. This tier 355 enables the integration of network reported fault indications from the repair management tier 357 systems and provides value-added common business process features. Consequently, efficient service restoration and equipment repair tracking are attained.

Specifically, the fault processing tier 355 provides the following services through one or more combinations of the modules 355a-355e. For instance, the topology services module 355a provides an interface to several external databases for accurate and timely topology (if available) and customer correlation to events being generated in the networks 105 and 107. The fault handling module 355b provides fault/event data repository and reporting services, such as storing the alarms and events and all associated data as well provides user reporting capabilities. The command factory module 355c provides the ability to interact with managed elements in the network 103.

The primary functions of the topology services module 355a include providing customer and circuit correlation services on a real-time (e.g., sub-second) basis and to provide a topology layer to buffer the platform 101 from constant topology system changes. The module 355a queries for topology data and has the capability to subscribe to automatic updates as this information changes in the source systems. The topology services module 355a provides alarm to customer/circuit correlation and network topology for fault correlation/automation. This module 355a can interface with several network provisioning and configuration management systems to execution of the above functions.

The topology services module 355a can interconnect with the database (not shown) of the services portal 353b to allow access to the customer and circuit specific information (e.g., device/circuit, Public Switched Telephone Network (PSTN) dial-up number, customer data, and customer sensitivity notification level, etc.) in that repository. For example, the topology services module 355a can, in certain embodiments, populate the city, state, and country fields on the alarm so that flashes can be generated automatically. Also, the module 355a can add circuit identifier (ID) and customer name information to the alarms. Additionally, the topology services module 355a can obtain maintenance information from the repair management tier 357 to correlate reported alarms and maintenance events in progress.

The fault processing tier 355 also provides service restoration and outage management, including automatic service restoration for some network types and an interface into outage tracking and notification systems.

As part of the fault processing tier 355, the command factory module 355c also provides an interface to other applications and a common interface for all managed network devices. The command factory module 355c, in an exemplary embodiment, is a web-based application that provides users with generic command capabilities and remote access to network devices. For example, the command factory module 355c can provide access to transport switches, digital cross connects, frame relay switches, ATM switches, or private IP devices. Access to the devices can be controlled such that only personnel who are authorized to access network devices in their Area Of Responsibility (AOR) can do so. Command level security is supported to determine which users/groups can invoke specific generic commands.

The automation engine 355d and the workflow engine 355e provide ticketing, automation, and workflow services. For example, the automation engine 355d can automate many of the routine network operation center responsibilities. The engine 355d provides the capability to modify automation scenarios to quickly adapt to customer needs. The automation engine 355d provides an interface to the trouble management system of the repair management tier 357.

Workflow services are provided to the events created within the system, such as status tracking and correlation of "clear" status indication. The workflow engine 355e provides event management services, which enable multiple alarms to be associated to a single network event, and permit tickets to be opened via the trouble management system (as well as verification of the problem resolution).

Events created by the workflow engine 355e are the internal tracking mechanism for groups of related alarms (or network troubles). Each event can have an associated trouble ticket, such that the event can be configured to close that ticket when the network problem is resolved and the alarms are cleared. To efficiently address potential recurrence of the problem, timers can also be configured to hold events open for some period of time before they are closed.

The workflow engine 355e can create trouble tickets based on alarms from the real-time management and analysis module 353a and refer them to the testing system within the repair management tier 357 for processing. The workflow engine 355e can populate a trouble ticket symptom code with a code that corresponds to the alarm type being reported. Exemplary system codes include: IP down (e.g., router interface not responsive to PING), network connection down (e.g., connection within network has failed), interface down (e.g., failure of circuit between router and WAN), router down (e.g., failure of access circuit), etc. The engine 355e can also pass additional fields needed for circuit testing. According to various embodiments of the present invention, the workflow engine 355e can allow previously opened trouble tickets to be populated on the alarms within the system.

The fault processing tier 355 also provides network maintenance and change management services, including providing an interface to track network equipment maintenance to shield the operations centers from alarms that are generated from known maintenance activities. Additionally, the fault processing tier 355 supports event forwarding services. These services provide the ability to forward alarms (e.g., aggregated and unaggregated alarms) out of the alarm management platform 101 to external systems that may require the information.

The repair management tier 357 comprises a number of systems: a surveillance and operations system 357a, a maintenance and reporting system 357b, a testing system 357c, a trouble management system 357d, a resource manager 357e, and a customer portal 357f.

The maintenance and reporting system 357b provides a reporting system that is used to support managed services requirements based on data in services portal 353b and from events received from the managed customer networks. The system 357b provides a full services reporting environment including pre-defined and scheduled reports (supported by the testing system 357c), user defined reports, and ad-hoc reports.

By way of example, the customer portal 357f is a secure web portal service that provides an interactive experience for the managed services customer, including access to project and order status for site implementations, upgrades and other services, network inventory, procedures, circuit numbers, etc. The customer is also able to update their site contact information directly through the customer portal 357f. The customer portal 357f, in an exemplary embodiment, can utilize the same database as the services portal 353b. The customer portal 357f provides a GUI for customer access to the change management subsystem of the services portal 353b. The portal 357f can also support customer notifications of service problems, trouble tickets, status of trouble isolation, change request approvals, etc. In addition, the portal 357f can receive customer responses (e.g., acknowledgement or denial of ticket closure requests). Users can access graphical network topology views through the customer portal 357f. Further, the portal 357f has a reporting capability, whereby the users can obtain pre-defined and customized reports—e.g., scheduled reports and ad-hoc reports based on all data available through the customer portal 357f. The customer portal 357f also interfaces with the automation engine 355d for updates of the customer network problems and customer response confirmations on network testing and valid fault conditions.

The trouble management system 357d is integrated with the platform 101 to enable alarm to ticket creation workflow and tracking. The trouble management system 357d is utilized network operations centers (NOCs) (not shown) to document and track network and customer reported problems. The trouble management system 357d is also used for pro-active customer notifications based upon created tickets and notification criteria.

The testing system 357c, in an exemplary embodiment, provides the service provider with an intelligent, integrated, and easy-to-use circuit and element testing, and fault isolation product. The testing system 357c can be used to support newly installed circuits and to resolve customer reported (maintenance) problems. The testing system 357c supports automation features for performing automated fault isolation and testing initiated from the trouble management system 357d. Fault isolation involves gathering circuit topology information, accessing remote network elements (of the customer network 103) to retrieve real-time statistics, and performing intrusive testing.

The testing system 357c can then, for example, perform circuit based fault isolation and testing off of the generated trouble ticket. The testing system 357c can then add results from the circuit diagnosis as remarks to the trouble ticket for viewing by the user. In addition, the testing system 357c supplies the workflow engine 355e with ticket state (transition) updates as well as final remarks of the circuit test.

The testing system 357c updates the trouble ticket and refers the ticket back to the responsible organization or out to the LEC (Local Exchange Carrier) for resolution based on cause of the fault (e.g., via a fault isolation code). The testing system 357c, in real-time, updates the workflow engine 355e with testing status and final comments. The testing system 357c, according to one embodiment of the present invention, supports a graphical user interface (GUI). This GUI can be launched via the interface of the surveillance and operations system 357a.

By way of example, operation of the automation architecture 351 under an exemplary scenario, such as a CPE circuit failure, is explained as follows. While the automation operation is described as a serial process, it is contemplated that the automation can occur in parallel and that multiple scenarios can be active at any one point in time. First, alarms are reported from the customer network 103 as well as the service provider's network equipment. These alarms are collected and analyzed by the real-time management and analysis module 353a, which analyzes the reported alarms via, for example, standard algorithms to determine the most likely source of the failure. Based upon this "root cause analysis," the module 353a produces a derived alarm, which identifies the failed circuit and CPE equipment, and communicates it to the fault processing tier 355. The fault handling module 355b stores the received alarm and determines which processes have "subscribed" to receive these alarms. The fault handling module 355b queries the topology services module 355a to obtain additional information relevant to network topology, customer information, and maintenance indication. This information is used to augment the derived alarm.

The automation engine 355d receives the derived alarm and matches the derived alarm contents with defined automation rules. Automation rules determine how an event will be handled based on observed conditions. The automation engine 355d can check an "Automation Eligible" flag to determine whether to proceed with the automation process. The flag can be set based on customer preference. If it is set to "true," automation continues; otherwise, the automation engine 355d does not perform any further action on this alarm. The automation engine 355d then opens a workflow event, which handles and acknowledges the alarm. Automation will then wait a configurable time period (e.g., 5 minutes). If the alarm is still outstanding after the configurable time period, the automation will continue. Otherwise the automation engine 355d closes the event and releases the alarm, removing it from the operator display. Thereafter, the alarm is communicated to the GUI of the surveillance and operations system 357a via the component interface of the fault handling module 355b. The derived alarm represented on the GUI can be marked as handled by the automation system, and used to enable personnel to examine the status of automated problem resolution at any requested time.

The automation engine 355d examines and matches the reported fault to a defined automation script. Assuming a match is found in this scenario, the automation engine 355d issues a query to the topology services module 355a for customer information, trouble handling procedures and any scheduled maintenance activity relative to the derived alarm from the real-time management and analysis module 353a. If no matching automation script is found to fit the reported fault, then the derived alarm of the automation engine 355d is declared "unhandled," which indicates that this fault requires manual intervention.

The topology services module 355a receives the request from the automation engine 355d and acts as the proxy in obtaining the necessary information from the services portal 353b (e.g., an enterprise services portal (ESP)) and communicates the acquired information back to the automation engine 355d. Alternatively, the topology information may have been previously acquired and stored, and subsequently updated on a periodic basis.

The automation engine 355d updates the workflow event with the acquired customer information. Additionally, the automation engine 355d checks the maintenance indicator on the alarms derived from the real-time management and analysis module 353a and determines if a maintenance event affecting this circuit is "active." If active, the automation engine 355d updates the event and derived alarms with "maintenance" indication and identification. The engine 355d employs automation script rules to determine subsequent actions, which could range from "no further action required" to "continuing with the corrective action automation." If no further action is indicated, the automation engine 355d will monitor the alarms for clearance and close the workflow event at that time. However, if a maintenance event is no longer active and the alarm persists, then the automation scenario continues.

According to an exemplary embodiment, the automation engine 355d requests the workflow engine 355e to determine whether an open trouble ticket already exists against the failed circuit. Next, the automation engine 355d requests the workflow component to either open a new ticket against an already open ticket or open a new ticket for the failed circuit. That is, if a ticket already existed, the original ticket can be linked to the new ticket. The information previously obtained from topology services module 355a and the network elements is used for creation of the ticket.

The alarm, along with the opened ticket and customer information, is handed off to NOC operations for further problem handling. Based upon scenario defined actions, the automation engine 355d queries the alarming network elements via the command factory (CF) component 355c based upon the derived alarms and obtains scenario defined outage confirmation and/or additional information. The command factory component 355c can utilize both in-band and out-of-band connectivity to perform interactions with network element interactions, including those on the customer network side. This information is updated in the workflow event.

The automation engine 355d invokes communication with the customer portal (CP) component 357f and requests information relative to the failed circuit and ticket number be placed in the affected customer's view. In addition, the automation engine 355d, according to one embodiment, can invoke a Common Object Request Broker Architecture (CORBA) "method" (defined within the trouble management system 357d) for proactive notification to the customer via service level agreement (SLA) agreed upon mechanisms, which include pager, e-mail and cell phone text messaging, for example. Notifications to the customer are completed by the automation component requesting the trouble management system 357d to perform the notification. This information is obtained from the services portal 353b via a prior query from the topology services module 355a.

The automation engine 355d updates the workflow event with current time and status indicating the customer confirmation required. The automation engine 355a then waits for a period of time, as defined by an automation script, to enable customer approval of diagnostic or corrective actions to be taken by the service provider. It is contemplated the approval can be pre-arranged for certain actions, or conditions.

The customer can respond either directly via the customer portal 357f or indirectly via the network (or managed service) operations center (not shown) with the following: confirmation of outage and authorization for invasive testing (which can include a customer identified time window); and rejection of the outage and request for the service provider to ignore the failure (which could be caused by intentional activities at customer location). If the customer responds to the managed service operations center, then personnel updates the customer portal 357f with the confirmation or rejection information. The customer portal 357f can communicate the requested customer action back to the automation engine 355d for continuation of the automated actions.

The automation engine 355d re-activates, based upon either the received customer information from the customer portal 357f or the expiration of the scenario defined "wait" interval, and updates the workflow event of the time and automation status. If the customer "rejects" the failure, the automation engine 355d updates the previously created derived alarm indicating customer initiated activity. The opened trouble ticket turned over to the customer for resolution, and the automation scenario is terminated. The automation engine 355d closes the ticket and event upon alarm clearance. If the customer confirms or the time period expires, the automation engine 355d refers the ticket via, for example, CORBA defined methods of the trouble management system 357d to the testing system 357c for diagnosis activities. In one embodiment of the present invention, the customer can specify whether to allow testing.

The automation engine 355d and workflow engine 355e awaits notification from the testing system 357c of the results. The testing system 357c automatically receives the trouble ticket, and notifies the workflow engine 355e that fault diagnosis and testing has commenced. Based upon content within the ticket, the testing system 357c invokes additional network diagnostic activities. If circuit testing is required and authorized, the testing system 357c can, in certain embodiments, invoke the appropriate test and store the results in the ticket. The workflow engine 355e can update the event with time and status indicating that the testing system 357c has problem diagnosis in progress.

Based upon the diagnostic and test results, the testing system 357c performs the following. The testing system 357c uses the trouble management system 357d to refer the ticket out for action. In an exemplary embodiment, using CORBA methods, the ticket is referred out to the appropriate "fix" organization. For example, for Field Repair actions, the ticket is referred to the resource manager component 357e via existing rules of the trouble management system 357d, which schedules the repair action.

For further problem analysis, the ticket can be referred to the appropriate operations group of the service provider or a third party. The testing system 357c then notifies the workflow engine 355e that diagnosis is complete and the ticket has been referred out. The workflow engine 355e updates the event with the time and refer-out action communicated by the testing system 357c. The automation engine 355d and workflow engine 355e await ticket updates received from the trouble management system 357d based upon resolution activities. Upon problem resolution, the ticket is referred back to the automation engine 355d.

In parallel with or prior to the above processes, the network elements reporting the original failure may issue "clear," which the real-time management and analysis module 353a maps to the original alarm and communicates an "alarm clear" condition to the automation engine 355d.

Consequently, the automation engine 355d receives the alarm clear indications and the refer-back notification from the trouble management system 357d and examines the status. If the ticket indicates that it is resolved and all of the reported workflow event alarms are in a "clear" state, then the automation engine 355d issues an update to customer portal 357f with status indicating the failure has been corrected. The ticket is placed on "customer time" via a standard trouble ticketing method.

The engine 355d then waits for expiration of automation-scenario-defined customer time interval. If the trouble management system 357d indicates the ticket is resolved, or is on customer time, and the alarms are not clear, the automation engine 355d places the ticket back in the "To Be Worked" state, which is an indication to the engineer that they need to take some action.

Subsequently, the automation engine 355d terminates the automation process. Upon expiration of the customer time interval, the automation engine 355d updates the time and status in the event, and closes the ticket and the event.

The above exemplary scenario represents one of many automated fault handling "scripts." Each scenario generally follows the same sequence of steps with variances dependent upon the received network fault conditions. Further, the automation architecture 351 supports a variety of automation scenarios that are concurrently active and in differing states of completion at any one point in time.

Errors within the automation process (e.g., a failure to create an event) results in termination of the automated process and returning of the alarm to the user (e.g., network analyst, NOC engineer, etc.). Additionally the state of the event can be frequently updated to communicate the progress of the automation to the engineer.

As evident from the above description, the automation architecture 351 supports the use of rules for the workflow events. According to one embodiment of the present invention, the specification of rules associated with any given automation scenario or script can be definable and configurable via, for example, a desktop workflow "wizard." The defined rules and/or scripts of the wizard can, in some embodiments, be used by the automation engine 355d to determine and govern the actions to be taken for each alarm reported condition.

The automation architecture 351, as explained above, has a number of advantages, including rapid fault isolation, thereby permitting high network performance and reliability. Faults are not only isolated, but through automated scripts, appropriate tests are initiated across each test point across within the network and across various networks (including third parties). For instance, faults isolated to the local loop are automatically referred out to the local exchange carrier. Analysts are presented with a detailed analysis of what has transpired and can now escalate within the appropriate party. Customers are automatically notified when a trouble ticket is opened, and kept update as the status of the event changes, without requiring human intervention. The automation process also advantageously handles a multitude of alarm situations in parallel, and can gather pertinent information from various systems. Further, the system 100 can differentiate sequence of actions based on observed conditions, and take alternative actions when a subprocess (such as testing) is busy or unresponsive.

Figure 4:
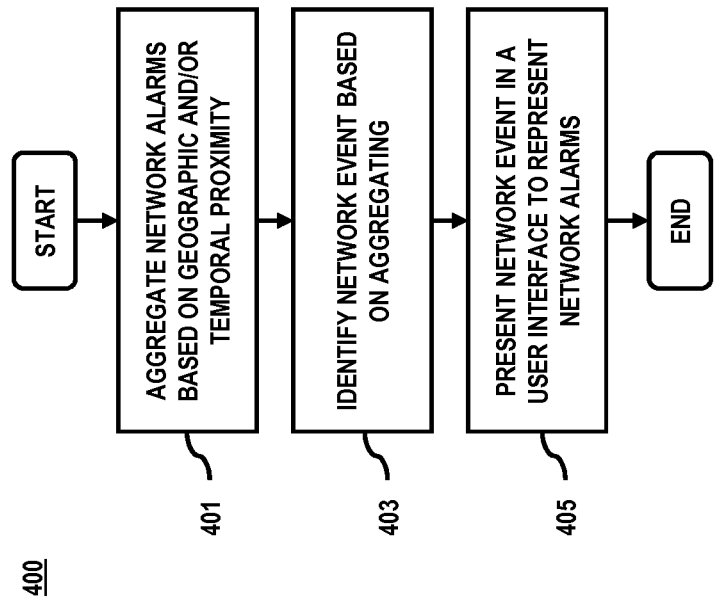
FIG. 4 is a flowchart of a process for providing aggregated network alarms, according to one embodiment.
Figure 9:
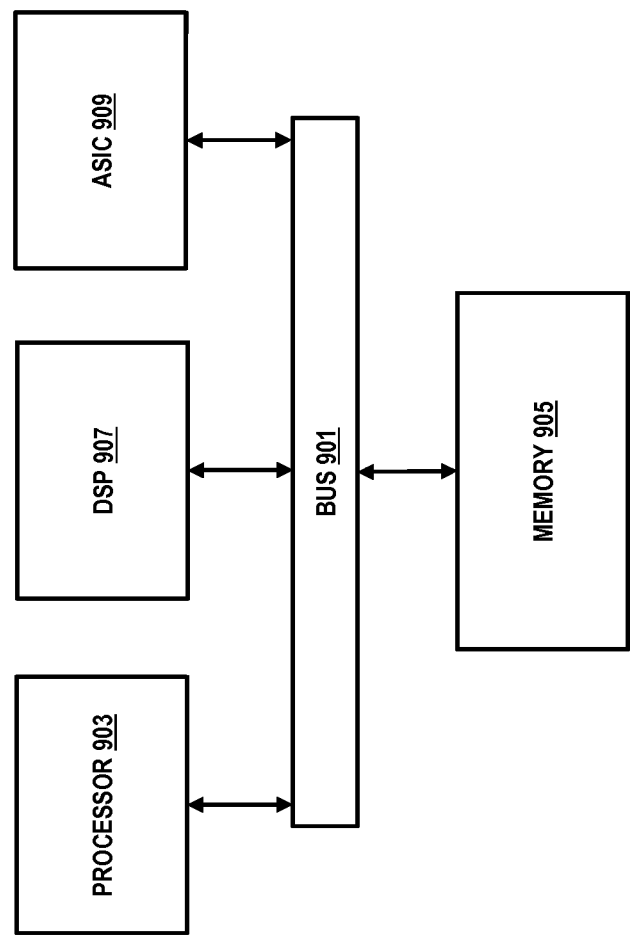
FIG. 9 is a diagram of a chip set that can be used to implement an embodiment of the invention.

FIG. 4 is a flowchart of a process for providing aggregated network alarms, according to one embodiment. In one embodiment, the alarm management platform 101 performs the process 400 and is implemented in, for instance, a chip set including a processor and a memory as shown in FIG. 9.

Although the steps are described in an order, it is contemplated that, in one embodiment, the alarm management platform 101 may perform the described steps in any order or in any combination.

In step 401, the alarm management platform 101 aggregates one or more network alarms based on a geographic proximity, a temporal proximity, or a combination thereof. As previously described, the alarm management platform 101 collects a variety of network alarms (e.g., edge alarms 109, customer network alarms 111, and/or provider network alarms 113) from customer networks 105, provider networks 107, as well as the edges 103 between the networks 105 and 107. To reduce the volume of such alarms to a more manageable level, the alarm management platform 101 aggregates, clusters, and/or correlates alarms together based on proximity and/or time.

More specifically, the alarm management platform 101 applies criteria for geographic or temporal proximity of the alarms to aggregate or otherwise associated disparate alarms into a common network event. For example, the alarm management platform 101 applies criteria (e.g., maximum and minimum distance windows, maximum and minimum time windows, etc.) to determine when to group alarms together. It is assumed (e.g., based on statistics, expert knowledge, historical information, etc.) that alarms occurring in the same general area and at the same time are likely to be associated with the same network event (e.g., an outage or other equipment fault).

For example, Table 1 below provides example code that clusters or aggregate alarms based on geographic proximity. It is contemplated code for aggregating alarms by time will be similar. In the example of Table 1, the code defines minimum and maximum in two directions emanating from a theoretical center for a cluster or aggregation of alarms. As new alarms emerge or are process the theoretical center and/or extent of the clustering can be updated dynamically.

TABLE 1

```
a RADAR Cluster maintains
private minX, maxX, minY, maxY, sumX, sumY, count
private SortedSet<Point> pointSet note: this 'sort' is just the point 'name'
avgX( ) returns sumX/count
name( ) return String.join(pointSet.keySet( ),"|");
center( ) returns (avgX( ),avgY( ))
radius( ) returns max(maxX-minX, maxY-minY)
add(Point) updates the private variables (must not add the same point
twice)
add(Collection<Point>) invokes add(Point) in a loop
seed:
each point is in its own cluster of one point
then merge clusters
List<Clusters> results;
Set<Clusters> candidates;
while (candidates is not empty) {
Cluster c1 = candidates.first( );
candidates.remove(c1);
for (Cluster c2 : candidates) {
/// if(c1.intersects(c2)) {
/// c1.add(c2);
/// candidates.remove(c2);
/// }
if (c1.isWithinDistanceD(DISTANCE_5, c2) {
c1.add(c2);
candidates.remove(c2);
}
results.add(c1);
}
static intersects(Cluster c1, c2) {
for (Point p : c1.pointSet) {
return true if c2.pointSet.contains(p);
return false;
2
```

TABLE 1-continued

```
}
static boolean isWithinDistanceD (double d, Cluster c1, Cluster c2) {
newD = max(d, c1.radius( ) + c2.radius( ));
return isWithinDistanceD (newD, c1.avgX, c1.avgY, c2.avgX, c2.avgY);
}
static boolean isWithinDistanceD ( double d, x1, y1, x2, y2 ) {
dx = abs(x1 −x2);
return false if dx > d;
dy = abs(y1 − y2);
return false if dy > d;
dSqr = d * d;
dxSqr = dx * dx;
dySqr = dy * dy;
return false if (dxSqr + dySqr) > dSqr;
return true;
}
```

In one embodiment, the clustering is performed based on a circular shape with a center and radius as the proximity parameters. However, it is contemplated that any shape (regular or irregular) can be used to define a cluster. By way of example, in some embodiments, the shape applied to a given cluster of alarms can be based on the type of nature of the alarms, underlying geography, network topology if available, and/or any other contextual information about the alarms, affected geographic areas, affected customers, etc.

In step 403, the alarm management platform 101 identifies a network event based on the aggregating of the one or more network alarms. For example, once alarms are clustered together by proximity and/or time, the alarm management platform 101 can determine a common network event (e.g., an outage, a fault, etc.) that correlates with the cluster. For example, if a router failure is the cause of the alarms aggregated in a cluster, that network event (e.g., the router failure) can be identified with the cluster. In some embodiments, multiple network events may be associated with a cluster of alarms. In another embodiment, if no information is available or a network event cannot be identified, the alarm management platform 101 apply place holder or nonspecific label to the aggregated alarms.

In step 405, the alarm management platform 101 presents the network event in a user interface to represent the one or more network alarms. In one embodiment, the alarm management platform 101 can present or interact with a GUI system 117 to present the aggregated alarms in a user interface for access by network monitors. One example type of user interface is a mapping user interface that places the network event and/or associated aggregated alarms, affected geographic areas, etc. as map data in the mapping user interface.

Figure 5:
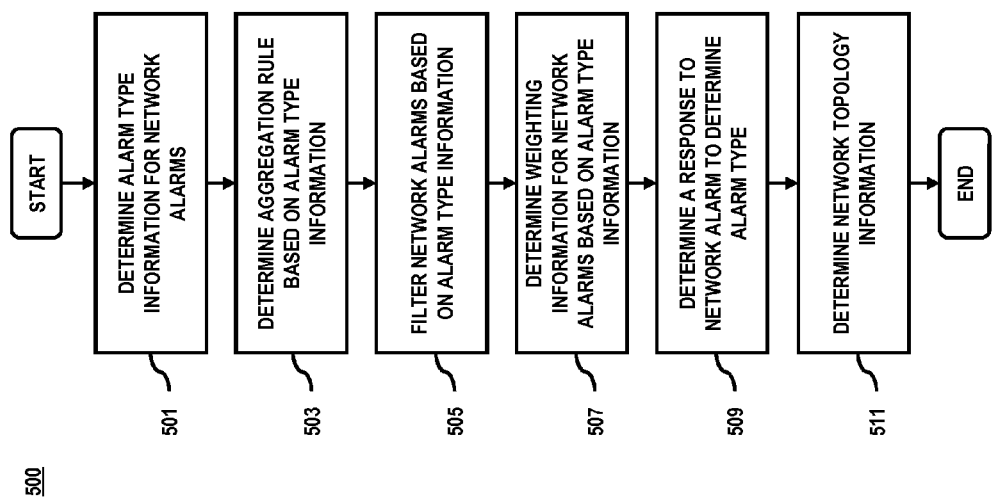
FIG. 5 is a flowchart of a process for aggregating network alarms based on alarm type information, according to one embodiment.

FIG. 5 is a flowchart of a process for aggregating network alarms based on alarm type information, according to one embodiment. In one embodiment, the alarm management platform 101 performs the process 500 and is implemented in, for instance, a chip set including a processor and a memory as shown in FIG. 9. Although the steps are described in an order, it is contemplated that, in one embodiment, the alarm management platform 101 may perform the described steps in any order or in any combination. The process 500 provides additional or optional steps for further aggregating network alarms in addition to or in place of one or more steps of the process 400 of FIG. 4.

In step 501, the alarm management platform 101 determines alarm type information for the one or more network alarms. In one embodiment, the aggregating of the one or more network alarms is further based on the alarm type information. More specifically, the alarm management platform 101 can determine characteristics of the network alarms, for instance, to provide for more granular aggregation, correlation, presentation, etc. of aggregated alarms. Accordingly, in some embodiments, the alarm management platform 101 can determine originating networks (e.g., customer network 105, provider network 107, edge 103, and/or a combination thereof) to further characterize the network alarms. For example, the alarm management platform 101 may use different aggregation approaches depending on the types of networks from which the alarms originate. Moreover, as previously discussed, alarm type information may characterize the type of equipment or failure that resulted in the alarm (e.g., IP down, router down, line cut, etc.). Similarly, information on equipment and/or failure types may be used to determine aggregation or clustering schemes.

In step 503, the alarm management platform 101 determines an aggregation rule based on the alarm type information, the one or more network alarms, or a combination thereof. In one embodiment, the aggregating of the one or more network alarms is performed based on the aggregation rule. In one embodiment, the alarm management platform 101 can use rules to define how it will aggregate alarms. For example, rules enable network administrators to specify how certain types of network alarms are to be aggregated. In one embodiment, the rules are based on expert knowledge from experienced network administrators or monitors. In another embodiment, the rules can be derived by analysis of statistical response data, historical data, and the like.

In step 505, the alarm management platform 101 filters the one or more network alarms based on the alarm type information. In one embodiment, the aggregating of the one or more network alarms is based on the filtered one or more network alarms. As previously discussed, in a monitored network environment, there are usually a multitude of network alarms. In some cases, many of these alarms represent noise or clutter due to extraneous alarms, false alarms, alarms that do not rise to a level of concern, self-correcting faults, etc. Accordingly, the alarm management platform 101 can apply filters to reduce or eliminate alarms that are classified as noise or clutter. Similar to the aggregation process, in one embodiment, the alarm management platform 101 can apply one or more filtering rules (e.g., rules based on alarm type) to filter incoming alarm streams. By way of example, the filtering rules may be created by experts and retrieved from a knowledge base or may be created from analysis of historical data.

In step 507, the alarm management platform 101 determines weighting information for the one or more network alarms based on the alarm type information. In one embodiment, the filtering of the one or more network alarms, the aggregating of the one or more network alarms, or a combination thereof is further based weighting information. More specifically, the alarm management platform 101 can determine specific weighting to apply to different alarms or alarm types. For example, a fiber optic line cut may be weighted more than a router failure. In one embodiment, the alarm management platform 101 can use expert knowledge from a knowledge base to apply appropriates weights to different alarms. In some embodiments, the weighting can be changed based on repeated alarms, multiple alarms, etc.

In step 509, the alarm management platform 101 determines a response to the one or more network alarms. In one embodiment, the filtering of the one or more network alarms, the aggregating of the one or more network alarms, or a combination thereof is further based the response. For example, alarm management platform 101 can interface (e.g., via application programming interfaces) to the maintenance management system 119, the network testing system 121, the trouble management system 123, and the like to determine what types of responses (e.g., maintenance tickets being issued, trouble tickets being issued, etc.) are being taken in response to specific alarms. If a trouble ticket, for instance, is issued in response to an alarm, the particular alarm may carry more weight or may otherwise more greatly influence the aggregating, filtering, etc. of incoming alarm streams.

In one embodiment, the alarm management platform 101 characterizes the one or more network alarms, the alarm type information, or a combination thereof based on a progression of the one or more network alarms, the response, or a combination thereof over a period of time. For example, as responses (e.g., trouble tickets) are cleared, the alarm management platform 101 can characterize the alarm as dissipating, whereas if tickets are actively being issued the alarm can be characterized as peaking. In one embodiment, the alarm management platform 101 can model the life cycle of different alarms and/or alarm types to determine the expected progression or responses. This modeling can then be used to characterize the alarms and the characterizations represented in the presentation user interface. For example, color coding, icons, etc. can be used to different characteristics of an alarm.

In step 511, the alarm management platform 101 determines network topology information associated with the one or more network alarms. In one embodiment, the aggregating of the one or more network alarms, the identifying of the network event, or a combination thereof is further based on the network topology information. As previously discussed, the alarm management platform can use any available network topology information to aggregate or cluster alarms and/or to determine the affected geographic areas or customers. In one embodiment, the network topology information can be used to supplement the proximity and time based aggregation of alarms when such information is available.

Figure 6:
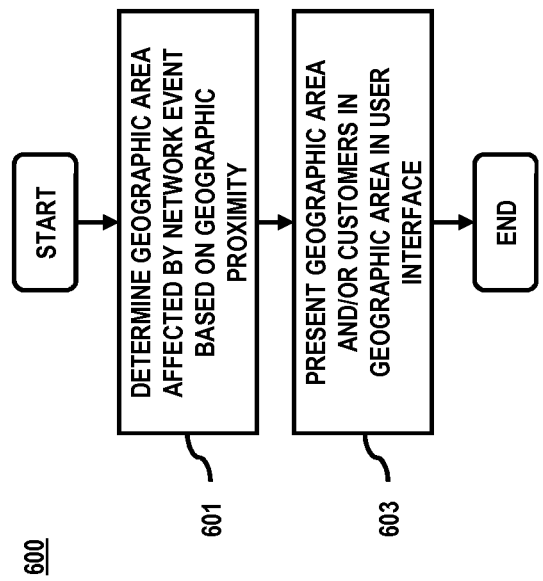
FIG. 6 is a flowchart of a process for presenting network alarms by geographic area, according to one embodiment.

FIG. 6 is a flowchart of a process for presenting network alarms by geographic area, according to one embodiment. In one embodiment, the alarm management platform 101 performs the process 500 and is implemented in, for instance, a chip set including a processor and a memory as shown in FIG. 9. Although the steps are described in an order, it is contemplated that, in one embodiment, the alarm management platform 101 may perform the described steps in any order or in any combination.

In step 601, the alarm management platform 101 determines a geographic area affected by the network event based on the geographic proximity of the one or more network alarms. As illustrated in the code example above, the alarm management platform 101 can determine a distribution of the locations associated with clustered alarms to determine a geographic area potentially affected by a cluster of alarms. In some cases the geographic spread of the clustered alarms can be used to estimate radius or other boundary for the affected geographic area. In one embodiment, the spread or extent of the affected geographic area is estimated without regard to the physical geography or network topology for the area, thereby obviating a need for such information. In this way, the alarm management platform 101 can quickly present an estimated affected area even when topology or geography is not known or otherwise unavailable.

In step 603, the alarm management platform 101 presents the geographic area, information related to one or more affected customers in the geographic area, or a combination thereof in the user interface. In addition to determine the geographic area affected by aggregated alarms, the alarm management platform may also determine or estimate the number customers within the affected areas. In one embodiment, the alarm management platform 101 estimates the number of affected areas using customer density information about the affected areas. In this way, the alarm management platform 101 need not know or have access to specific customer information (e.g., addresses or locations of customers within the affected areas).

FIGS. 7A-7C are diagrams of user interfaces utilized in the processes of FIGS. 1-6, according to various embodiments. As shown, the example user interfaces of FIGS. 7A-7C include one or more user interface elements and/or functionalities created and/or modified based, at least in part, on information, data, and/or signals resulting from the processes (e.g., 400, 500, and 600) described with respect to FIGS. 1-6.

FIG. 7A illustrates a graphical user interface (GUI) 700 depicting three network event representations 701*a*-701*b* (also collectively referred to as representations 701) of respective network events (e.g., Outage A, Outage B, and Outage C) on a mapping user interface. In one embodiment, the alarm management platform 101 identifies the network events from clustering or aggregating associated network alarms using proximity and time based clustering rules as previously described. In this example, for instance, multiple alarms were triggered across the edge 109, the customer network 103, and the provider network 105. In traditional alarm user interfaces, each of the alarms would be shown as distinct data point on the map 703. When the number alarms is large, it can be difficult for network monitors to determine whether the distinct points are part of the same network event or part of separate events. This problem is particularly acute when, for instance, the network events overlap or very close in proximity (e.g., Outage A and Outage B).

In this example, the alarm notification has aggregated the various underlying network alarms by proximity and time into the three network events indicated by network event representations 701*a*-701*c*. As shown, the radii of the representations 701 are based on the calculated extent of the geographic area affected by the respective outages. Although the circles of the representations 701 may not represent the actual affected geographic areas, they provide a quick estimate for network monitors to identify relative impact areas. In addition, the alarm management platform 101 can indicate other characteristics of the outages through the representations 701. For example, as shown, outages that are dissipating (e.g., Outage B) has a representation 701*b* whose circle is drawn with a hollow line, whereas outages that are peaking (e.g., Outages A and C) have representations 701*a* and 701*c* whose circles are formed using a bold solid line. It is contemplated that the alarm management platform 101 can use any form or graphical representation (e.g., shading, transparency, color, etc.) to represent different properties or characteristics calculated for a given network event.

In addition to the map 703 view, the user interface 701 also presents a detailed view of the Outages A-C as shown in detail view 705. In the detail view 705, the alarm management platform 101 presents a list of the top outages. Additional information about each outage is also presenting including, for instance, (1) a time of the outage, (2) a duration of the outage, (3) a severity of the outage, and (4) an outage type (e.g., network, customer, mixed).

FIG. 7B illustrates a GUI 720 that provides a more detailed view of a selected outage. In this example, a network monitor has selected representation 701*a* to see more details about Outage A. As shown, the GUI 720 includes presents information for the following fields: (1) stage of outage, (2) category of outage, (3) calculated weight of outage, (4) total alarms, (5) customer alarms, (6) network alarms, (7) circuits, (8) customers, (9) tickets, (10) latitude, (11) longitude, and (12) calculated radius. The alarm management platform 101 presents both a current value and a maximum value (where applicable) for each field. Because Outage A is peaking in this example, the current value and the maximum value are the same. In a case where an outage is dissipating, the current value would be less than the maximum value. The fields presented in GUI 720 are provided for illustration and not as a limitation. It is contemplated that any field may be provided to give more information about the outage including, for instance, time of first and last alarm, time of first or last clearing of the alarm, etc.

In one embodiment, the alarm management platform 101 provides an option for network monitors to view the alarms aggregated for a particular network event. For example, as shown in FIG. 7C, a GUI 740 can be presented to show the alarms aggregated for Outage A. In this example, each alarm is indicated on a separate row with the following data fields: (1) present, (2) cleared, (3) customer, (4) circuit, and (5) ticket number. In one embodiment, if an alarm is aggregated or clustered incorrectly, a network monitor may use GUI 740 to make manual corrections. The network monitor may also add other alarms that were not automatically aggregated by the alarm management platform 101.

Figure 8:
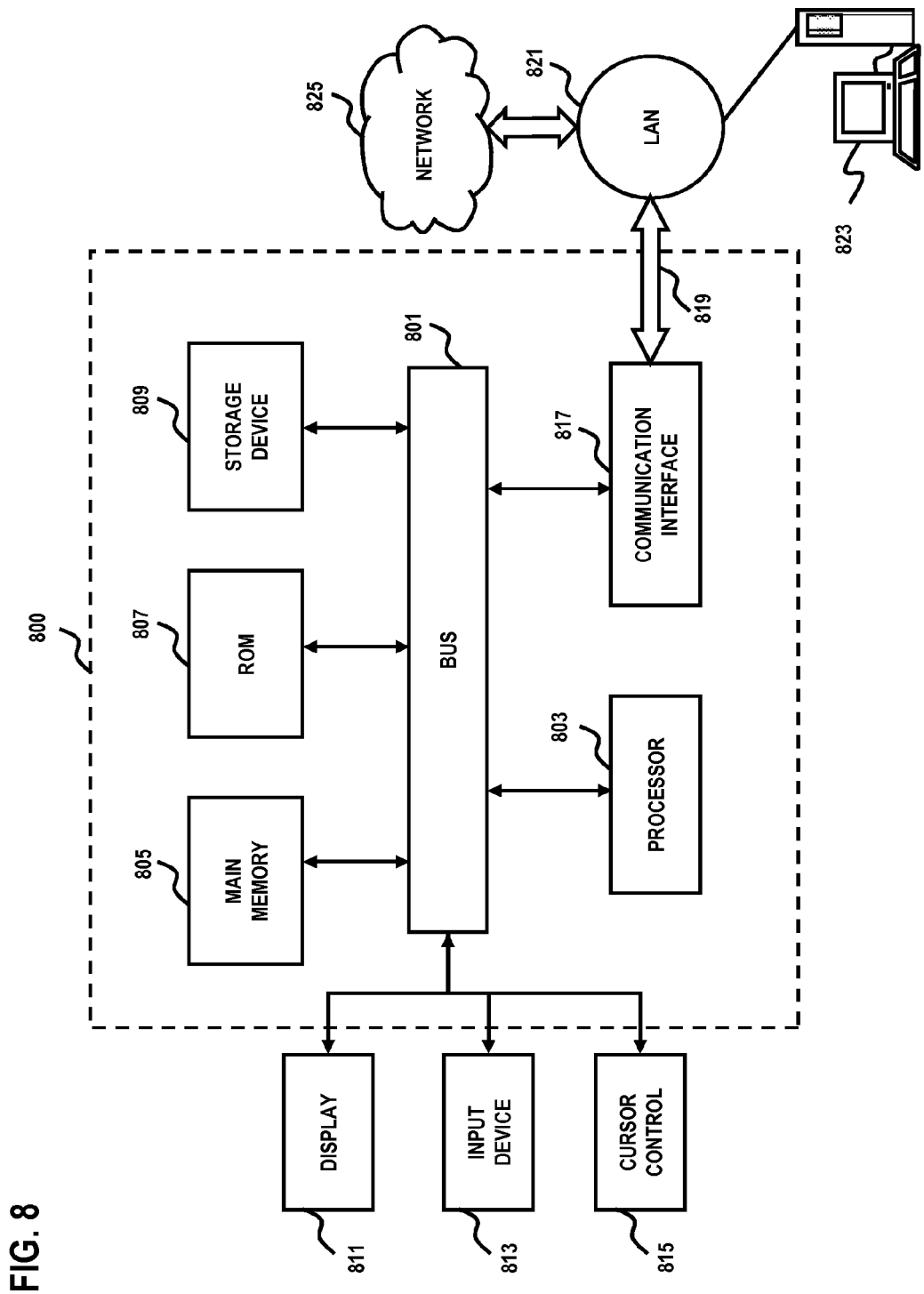
FIG. 8 is a diagram of a computer system that can be used to implement various exemplary embodiments.

FIG. 8 is a diagram of a computer system that can be used to implement various exemplary embodiments. The computer system 800 includes a bus 801 or other communication mechanism for communicating information and one or more processors (of which one is shown) 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for adjusting cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set or chip 900 upon which an embodiment of the invention may be implemented. Chip set 900 is programmed to provide personalized information regarding one or more physiological conditions associated with a user as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing personalized information regarding one or more physiological conditions associated with a user.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide personalized information regarding one or more physiological conditions associated with a user. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   aggregating one or more network alarms based on a geographic proximity, a temporal proximity, or a combination thereof,
   wherein the one or more network alarms are based on at least one detected anomaly of at least one network component;
   determining alarm type information for the one or more network alarms;
   filtering the one or more network alarms based on the alarm type information;
   identifying a network event based on the aggregating of the one or more network alarms,
   wherein the network event comprises at least one outage or at least one fault that corresponds to the at least one detected anomaly; and
   determining a geographic area affected by the network event based on the geographic proximity of the one or more network alarms; and
   presenting the network event via a user interface to represent the one or more network alarms, wherein presenting the network event comprises:
      presenting geographic area information related to one or more affected customers in the geographic area via the user interface,
   wherein the aggregating of the one or more network alarms is further based on the alarm type information and the filtered one or more network alarms.

2. A method of claim 1, further comprising:
   determining an aggregation rule based on the alarm type information, the one or more network alarms, or a combination thereof,
   wherein the aggregating of the one or more network alarms is performed based on the aggregation rule.

3. A method of claim 1, further comprising:
   determining weighting information for the one or more network alarms based on the alarm type information, wherein the filtering of the one or more network alarms, the aggregating of the one or more network alarms, or a combination thereof is further based on the weighting information.

4. A method of claim 1, further comprising:
determining network topology information associated with the one or more network alarms,
wherein the aggregating of the one or more network alarms, the identifying of the network event, or a combination thereof is further based on the network topology information.

5. A method comprising:
aggregating one or more network alarms based on at least one of geographic proximity or temporal proximity, wherein the one or more network alarms are based on at least one detected anomaly of at least one network component;
identifying a network event based on the aggregating of the one or more network alarms, wherein the network event comprises at least one outage or at least one fault that corresponds to the at least one detected anomaly;
determining alarm type information for the one or more network alarms, wherein the aggregating of the one or more network alarms is further based on the alarm type information;
filtering the one or more network alarms based on the alarm type information, wherein the aggregating of the one or more network alarms is based on the filtered one or more network alarms;
determining weighting information for the one or more network alarms based on the alarm type information, wherein the filtering of the one or more network alarms, the aggregating of the one or more network alarms, or a combination thereof is further based on the weighting information;
determining a response to the one or more network alarms, wherein the filtering of the one or more network alarms, the aggregating of the one or more network alarms, or a combination thereof is further based on the response; and
presenting the network event via a user interface to represent the one or more network alarms.

6. A method of claim 5, further comprising:
characterizing the one or more network alarms, the alarm type information, or a combination thereof based on a progression of the one or more network alarms, the response, or a combination thereof over a period of time.

7. An apparatus comprising a processor configured to:
aggregate one or more network alarms based on a geographic proximity, a temporal proximity, or a combination thereof,
wherein the one or more network alarms are based on at least one detected anomaly of at least one network device;
determine alarm type information for the one or more network alarms;
filter the one or more network alarms based on the alarm type information;
identify a network event based on the aggregating of the one or more network alarms,
wherein the network event comprises at least one outage or at least one fault that corresponds to the at least one detected anomaly;
determine a geographic area affected by the network event based on the geographic proximity of the one or more network alarms; and
present the network event via a user interface to represent the one or more network alarms, wherein when presenting the network event, the processor is configured to:
present geographic area information related to one or more affected customers in the geographic area via the user interface,
wherein the aggregating of the one or more network alarms is further based on the alarm type information and the filtered one or more network alarms.

8. An apparatus of claim 7, wherein the apparatus is further configured to:
determine an aggregation rule based on the alarm type information, the one or more network alarms, or a combination thereof,
wherein the aggregating of the one or more network alarms is performed based on the aggregation rule.

9. An apparatus of claim 7, wherein the apparatus is further configured to:
determine weighting information for the one or more network alarms based on the alarm type information,
wherein the filtering of the one or more network alarms, the aggregating of the one or more network alarms, or a combination thereof is further based on the weighting information.

10. An apparatus of claim 9, wherein the apparatus is further configured to:
determine a response to the one or more network alarms,
wherein the filtering of the one or more network alarms, the aggregating of the one or more network alarms, or a combination thereof is further based on the response.

11. An apparatus of claim 7, wherein the apparatus is further configured to:
determine network topology information associated with the one or more network alarms,
wherein the aggregating of the one or more network alarms, the identifying of the network event, or a combination thereof is further based on the network topology information.

12. A system comprising:
a network component configured to generate one or more network alarms; and
an alarm aggregation platform configured to:
aggregate the one or more network alarms based on a geographic proximity,
wherein the one or more network alarms are based on at least one detected anomaly of at least one network device;
determine alarm type information for the one or more network alarms, wherein the alarm type information identifies a type of equipment failure or communication line failure;
filter the one or more network alarms based on the alarm type information;
wherein the aggregating the one or more network alarms is further based on the alarm type information and the filtered one or more network alarms;
identify a network event based on the aggregating of the one or more network alarms,
wherein the network event comprises at least one outage or at least one fault that corresponds to the at least one detected anomaly; and
present the network event via a user interface to represent the one or more network alarms.

13. A system of claim 12, wherein the alarm aggregation platform is further configured to determine an aggregation rule based on the alarm type information, the one or more network alarms, or a combination thereof; and wherein the aggregating of the one or more network alarms is performed based on the aggregation rule.

14. The system of claim 12, wherein the alarm type information identifies a router failure.

15. The system of claim 12, wherein the alarm type information identifies a communication line failure.

* * * * *